US012482218B2

(12) United States Patent
Kim et al.

(10) Patent No.: US 12,482,218 B2
(45) Date of Patent: Nov. 25, 2025

(54) MACHINE LEARNING-BASED IMAGE NOISE LEARNING SERVER AND IMAGE NOISE REDUCTION DEVICE

(71) Applicant: HANWHA VISION CO., LTD., Seongnam-si (KR)

(72) Inventors: Dae Bong Kim, Seongnam-si (KR); Dong Jin Park, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 0 days.

(21) Appl. No.: 18/636,913

(22) Filed: Apr. 16, 2024

(65) Prior Publication Data
US 2024/0273855 A1 Aug. 15, 2024

Related U.S. Application Data

(63) Continuation of application No. PCT/KR2022/012508, filed on Aug. 22, 2022.

(30) Foreign Application Priority Data

Jul. 8, 2022 (KR) .......................... 10-2022-0084287

(51) Int. Cl.
*G06V 10/30* (2022.01)
*G06T 7/20* (2017.01)
(Continued)

(52) U.S. Cl.
CPC ................ *G06V 10/30* (2022.01); *G06T 7/20* (2013.01); *G06V 10/25* (2022.01); *G06V 10/60* (2022.01);
(Continued)

(58) Field of Classification Search
CPC ........ G06V 10/25; G06V 10/30; G06V 10/60; G06V 10/764; G06V 20/70;
(Continued)

(56) References Cited

U.S. PATENT DOCUMENTS 6,278,466 B1 * 8/2001 Chen ....................... G06T 13/00
345/473
2004/0066460 A1 * 4/2004 Kondo .................... G06T 7/254
348/222.1
(Continued)

FOREIGN PATENT DOCUMENTS

KR    10-2010-0020068 A    2/2010
KR    10-2017-0058277 A    5/2017
KR        10-1987079 B1    6/2019

OTHER PUBLICATIONS

International Search Report (PCT/ISA/210) issued on Mar. 24, 2023 by the International Searching Authority for International Patent Application No. PCT/KR2022/012508.
(Continued)

*Primary Examiner* — Peet Dhillon
(74) *Attorney, Agent, or Firm* — Sughrue Mion, PLLC

(57) ABSTRACT

An image noise learning server includes an image input interface configured to receive training images, and at least one processor configured to control an image extractor to extract, from the training images, a first image including a stationary object and a second image including a moving object, a noise filter to obtain a third image by applying noise filtering with a first intensity to the second image, the third image including the moving object, a labeling unit to determine an intensity of a side effect based on a difference between the stationary object included in the first image and the moving object included in the third image, and a machine learning unit to receive, as a label, the determined intensity of the side effect and image attributes of the training images, and obtain artificial intelligence (AI) parameters by performing machine learning on the second image based on the received label.

11 Claims, 11 Drawing Sheets

(51) Int. Cl.
  *G06V 10/25* (2022.01)
  *G06V 10/60* (2022.01)
  *G06V 10/764* (2022.01)
  *G06V 20/70* (2022.01)
(52) U.S. Cl.
  CPC ............ *G06V 10/764* (2022.01); *G06V 20/70* (2022.01); *G06T 2207/20081* (2013.01); *G06T 2207/20084* (2013.01); *G06V 2201/07* (2022.01)
(58) Field of Classification Search
  CPC ................ G06V 2201/07; G06T 7/20; G06T 2207/2008; G06T 2207/20084
  See application file for complete search history.

(56) References Cited

U.S. PATENT DOCUMENTS

| | | | | |
|---|---|---|---|---|
| 2005/0143183 | A1* | 6/2005 | Shirai | A63B 24/0006 473/151 |
| 2007/0127845 | A1* | 6/2007 | Fu | G06T 7/38 382/294 |
| 2009/0213933 | A1* | 8/2009 | Zuo | H04N 19/139 375/E7.193 |
| 2010/0188582 | A1* | 7/2010 | Hsu | H04N 5/145 348/607 |
| 2011/0164823 | A1* | 7/2011 | Park | G06T 7/194 382/199 |
| 2019/0333197 | A1 | 10/2019 | Kask et al. | |
| 2020/0034661 | A1* | 1/2020 | Kim | G06V 10/764 |
| 2021/0019507 | A1 | 1/2021 | Brookshire et al. | |
| 2021/0104021 | A1* | 4/2021 | Sohn | G06T 5/70 |

OTHER PUBLICATIONS

Written Opinion (PCT/ISA/237) issued on Mar. 24, 2023 by the International Searching Authority for International Patent Application No. PCT/KR2022/012508.

* cited by examiner

40a

MACHINE LEARNING-BASED IMAGE NOISE LEARNING SERVER AND IMAGE NOISE REDUCTION DEVICE

CROSS-REFERENCE TO RELATED APPLICATIONS

This application is a continuation of International Application No. PCT/KR2022/012508, filed on Aug. 22, 2022, in the Korean Intellectual Property Receiving Office, which is based on and claims priority to Korean Patent Application No. 10-2022-0084287, filed on Jul. 8, 2022, in the Korean Intellectual Property Office, the disclosures of which are incorporated herein by reference in their entireties.

BACKGROUND

1. Field

The disclosure relates to a device and method for reducing noise occurring in an image according to the characteristics of the image, using machine learning.

2. Description of Related Art

Related art techniques may measure the amount of noise included in an image and adjust the intensity of a noise filter based on that amount.

Noise reduction (NR) technologies for images are broadly divided into two-dimensional (2D) NR and three-dimensional (3D) NR. 2D NR uses information from a single frame in a spatial axis domain and corrects noise by referencing noise adjacent pixels. This is effective in reducing noise in moving objects but may cause blurring and resolution degradation in stationary objects such as backgrounds.

On the other hand, 3D NR uses information from multiple frames in a time axis domain, and corrects by referencing pixels across frames. Therefore, 3D NR has superior noise removal performance compared to 2D NR and is effective for noise in stationary objects. However, 3D NR may cause a ghost effect where moving subjects disappear, or a dragging effect such as motion blur, due to the use of information from multiple frames.

As such, the related methods only provide a standard for the appropriate intensity of a noise filter according to the occurrence of noise. As the intensity of the noise filter increases, the associated side effects are not considered, and in some cases, these side effects may become a greater problem than the noise removal effect itself. Therefore, there is a need for the development of a noise reduction technology that considers not only the size of the noise itself but also the intensity of the side effects caused by the application of the noise filter.

SUMMARY

Provided are an image noise reduction device and method capable of achieving appropriate noise reduction without degrading the quality of an image, by measuring a side effect that causes a deterioration in the image quality due to an increased intensity of the noise filter, based on a machine learning algorithm.

Additional aspects will be set forth in part in the description which follows and, in part, will be apparent from the description, or may be learned by practice of the presented embodiments.

According to an aspect of the disclosure, an image noise learning server may include an image input interface configured to receive training images, at least one processor configured to control an image extractor to extract, from the training images, a first image that includes a stationary object and a second image that includes a moving object, a noise filter to obtain a third image by applying noise filtering with a first intensity to the second image, the third image including the moving object, a labeling unit to determine an intensity of a side effect based on a difference between the stationary object included in the first image and the moving object included in the third image, and a machine learning unit to receive, as a label, the determined intensity of the side effect and image attributes of the training images, and obtain artificial intelligence (AI) parameters by performing machine learning on the second image based on the received label, and a communication interface configured to transmit the obtained AI parameters.

The training images may include images in which the stationary object starts moving and images in which the moving object stops moving.

The difference between the stationary object and the moving object may correspond to pixel differences between corresponding areas of the stationary object and the moving object.

The intensity of the side effect may be determined as a sum of the pixel differences.

The intensity of the side effect may be determined based on differences between high-frequency components from a plurality of frequency domain blocks included in the corresponding areas.

The stationary object and the moving object may include at least one person and the corresponding areas are edge portions of faces of the at least one person.

The noise filter may be a three-dimensional (3D) noise filter and the side effect may include at least one of a residual image phenomenon, a dragging phenomenon, and a ghosting phenomenon.

The image attributes may include at least one of a type of each of the stationary object and the moving object, a moving speed of at least the moving object, a moving direction of at least the moving object, and a brightness of each of the training images.

The at least one processor may be configured to control the machine learning unit to perform neural network learning on a plurality of training images in accordance with combinations of the image attributes.

The at least one processor may be configured to control the machine learning unit to repeat the neural network learning while changing the AI parameters until a difference between an intensity of a side effect obtained from the neural network learning and the determined intensity is within a predefined range.

The at least one processor may be configured to control a machine inference unit to infer an intensity of a side effect, and the intensity of the side effect inferred by the machine inference unit may be represented as a probability for the intensity of the side effect.

According to an aspect of the disclosure, an image noise learning server may include an image input interface configured to receive training images, at least one processor configured to control an object detection unit to set up bounding boxes by identifying objects from the training images, and classify the identified objects into a stationary object and a moving object, a noise filter to apply a noise filtering to the training images, a labeling unit to determine an intensity of a side effect based on a difference value for sizes of bounding boxes surrounding the stationary object and surrounding the moving object, respectively, in an image with the noise filtering applied thereto, and a machine learning unit to obtain AI parameters by performing machine learning on the training images using the determined intensity of the side effect as an input, and a communication interface configured to transmit the obtained AI parameters.

The difference value may represent a ratio of a difference between the sizes of the bounding boxes of the stationary object and the moving object to the size of each of the bounding boxes.

The at least one processor may be configured to control the machine learning unit to repeat the machine learning while changing the AI parameters until a difference between an intensity of a side effect obtained from the machine learning and the determined intensity is within a predetermined range.

According to an aspect of the disclosure, an image noise reduction device may include an image sensor configured to capture an image, a communication interface configured to receive AI parameters from an image noise learning server, and at least one processor configured to control a machine inference unit to infer an intensity of a side effect of the captured image by applying the AI parameters to the captured image, and a noise filter to change an intensity of noise filtering, and apply the changed intensity to the captured image based on the inferred intensity of the side effect exceeding a threshold value.

The at least one processor may be configured to control the noise filter to lower the intensity of the noise filtering based on the inferred intensity of the side effect being greater than the threshold value.

Based on the inferred intensity of the side effect being greater than the threshold value, the at least one processor may be configured to control the noise filter to lower an intensity of a three-dimensional (3D) noise filter and raises an intensity of a 2D noise filter based on the lowered intensity of the 3D noise filter.

The 3D noise filter may be a filter that removes noise with reference to an area of an object across multiple frames on a time axis, and the 2D noise filter may be a filter that removes noise using spatial adjacency within a single frame.

The at least one processor may be configured to control the machine inference unit to provide the inferred intensity of the side effect to the image noise learning server through the communication interface to update the AI parameters.

The communication interface may be further configured to packetize the image with the noise filter applied thereto as an image stream and transmit the image stream.

BRIEF DESCRIPTION OF DRAWINGS

The above and other aspects, features, and advantages of certain example embodiments of the present disclosure will be more apparent from the following description taken in conjunction with the accompanying drawings, in which.

DETAILED DESCRIPTION

Figure 1:
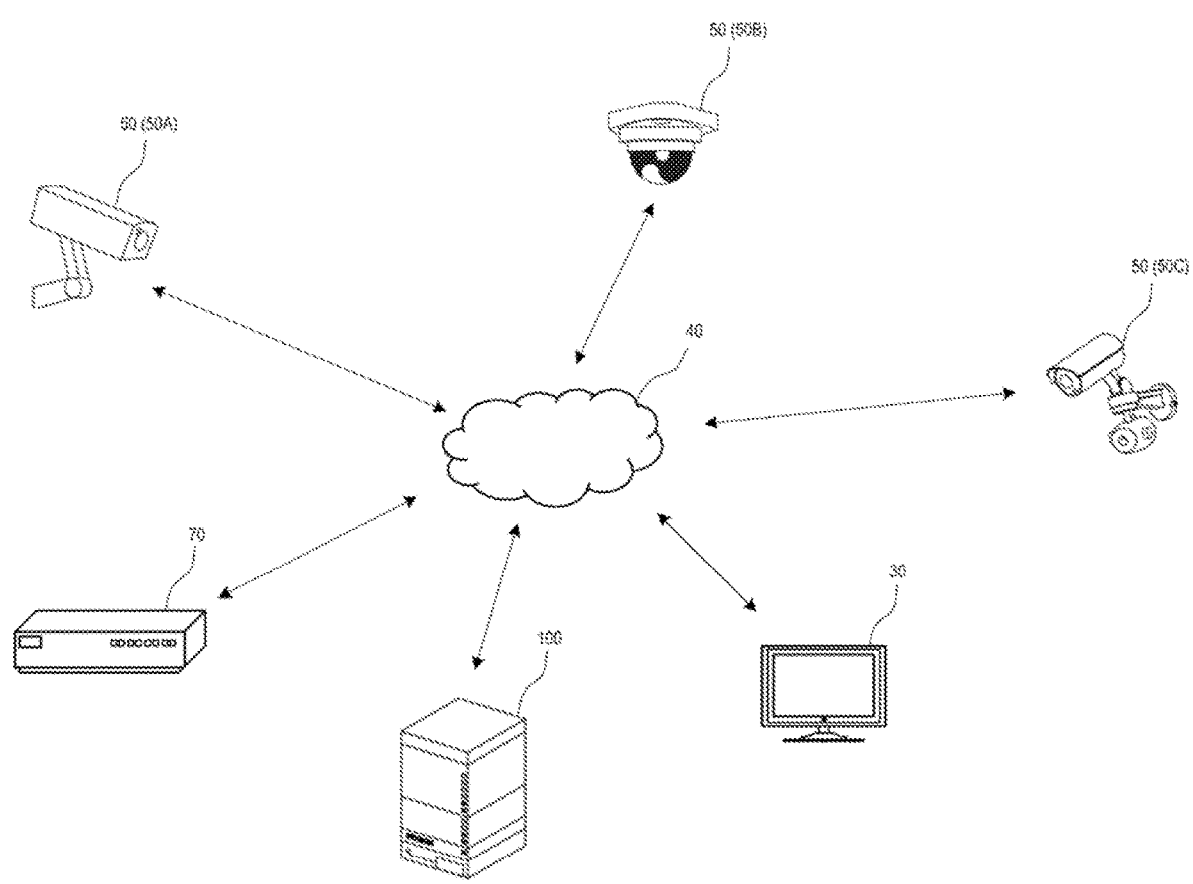
FIG. 1 is a diagram illustrating a configuration of an image processing system according to some embodiments of the present disclosure.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, example embodiments of the present disclosure will be described in detail with reference to the accompanying drawings.

FIG. 1 is a diagram illustrating a configuration of an image processing system 10 according to some embodiments of the present disclosure. Referring to FIG. 1, the image processing system 10 may include a plurality of network cameras 50 (50A, 50B, and 50C), a network video recorder 70, a user terminal device 30, and an image noise learning server 100, and each of the devices of the image processing system 10 may be interconnected and capable of communicating with one another through a network 40 such as the Internet or an intranet.

The network cameras 50 may capture images of surveillance areas from various locations on the network, and the network video recorder 70 may have the function of storing images provided from the various network cameras 50. Additionally, the user terminal device 30 may be implemented as a personal computer (PC), a mobile terminal, etc., and may be connected to the network cameras 50 and/or the network video recorder 70 via the network 40, enabling the search and display of captured images. As used herein, the term "image" may include both a moving image, such as a video, and a still image.

Generally, in the field of image processing, intrinsic important components of an image, such as edges or small details, may be referred to as features, and other components are defined as noise. Degradation of image quality occurring during noise reduction or noise removal are influenced by the intensity of the features of an image and the relative size of added noise, i.e., the size of noise variance. To minimize the degradation of image quality caused by such noise, it may be required to accurately estimate the degree or intensity of the noise included in the image.

Figure 2:
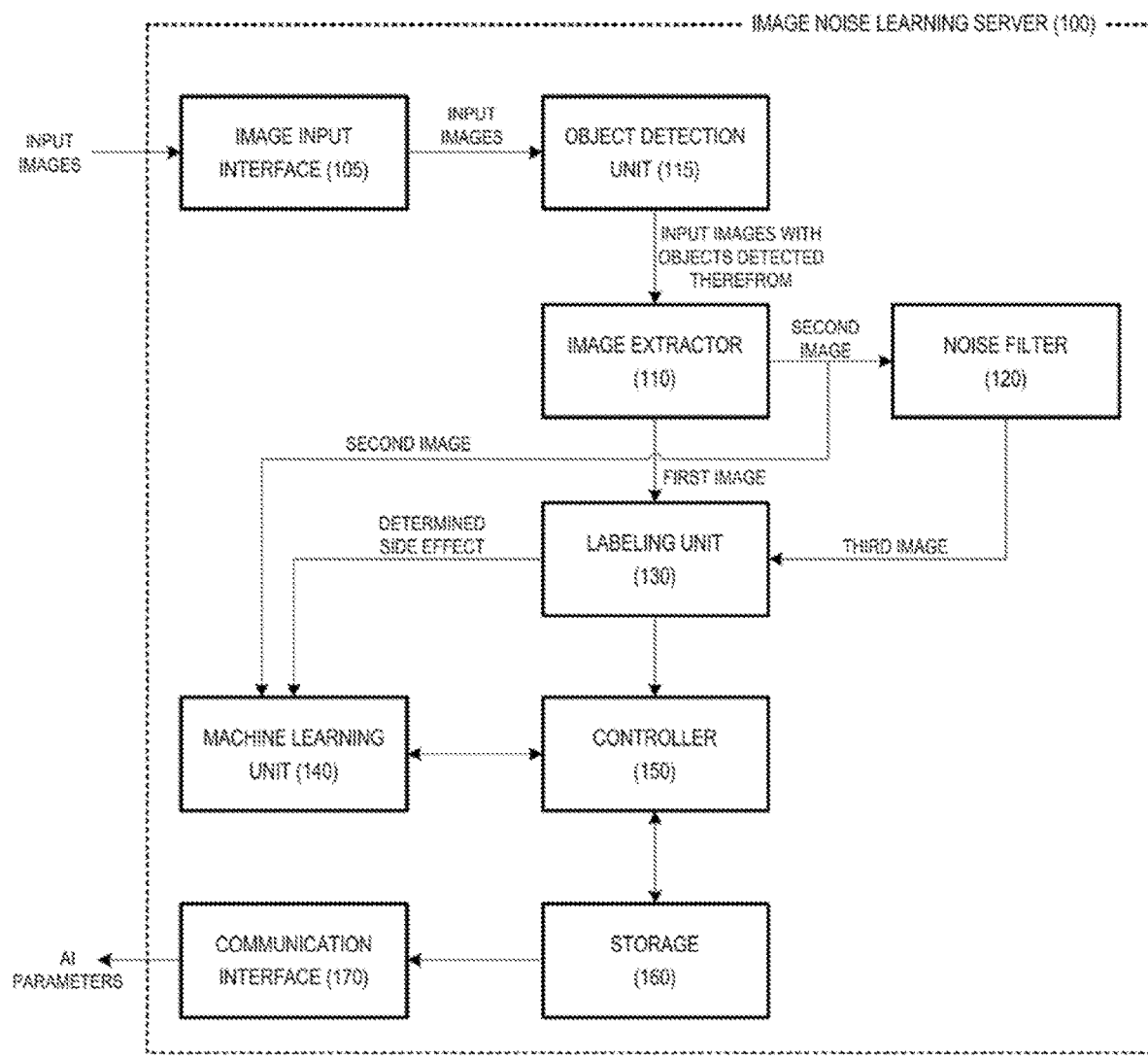
FIG. 2 is a block diagram illustrating a configuration of an image noise learning server according to some embodiments of the present disclosure.

FIG. 2 is a block diagram illustrating a configuration of an image noise learning server 100 according to some embodiments of the present disclosure. The image noise learning server 100 may include an image input interface 105, an image extractor 110, an object detection unit 115, a noise filter 120, a labeling unit 130, a machine learning unit 140, a controller 150, a storage 160, and a communication interface 170.

The controller 150 may control the operations of the other components of the image noise learning server 100 and may be implemented as a central processing unit (CPU) or microprocessor. Additionally, the storage 160, which may serve as a storage medium that stores result data from the operation performed by the controller 150 or data needed for the operation of the controller 150, and may be implemented as a volatile memory or a nonvolatile memory.

The image input interface 105 may be equipped with a network interface to receive input images. The input images may include training images provided over the network or real images, such as live images captured by external cameras 50 or stored images. The image input interface 105 may include any one or any combination of a socket, a plug, a cable, a universal serial bus (USB), a keyboard, a scanner, a digital modem, a radio frequency (RF) modem, an antenna circuit, a WiFi chip, and their equivalents along with related software and/or firmware.

The object detection unit 115 may detect objects included in the input images and the areas occupied by the objects. The objects may refer to entities that are distinguishable from the background and are independently identifiable within the images, and may be classified into various classes, such as people, cars, animals, etc. Object detection in an image may be performed in a method (e.g., You Only Look Once (YOLO)) that localizes an identified area within the image to set up bounding boxes, and classifies what entities are within the bounding boxes. Once the objects are detected from within the input images by the object detection unit 115, it may be possible to determine in consecutive image frames whether a particular object is moving or stationary, as well as to ascertain the size of the particular object as determined by the corresponding bounding box.

The image extractor 110 may separate and extract a first image including a stationary object and a second image including a moving object from the input image from which the object has been detected. The stationary object may refer to an object that does not move within the image, while the moving object may refer to an object that is in motion within the image.

The determination of whether each object is stationary or moving may be made by referencing a plurality of temporally adjacent image frames and determining whether the position of the object changes. Based on such determination, the image extractor 110 may extract, from the input images, both a first image including a stationary object and a second image including a moving object for the same object.

In some embodiments, the image extractor 110 may use only an image with a change in the movement of each object (i.e., a change in each bounding box) as training data. This is to facilitate the extraction of images that allow for easy comparison and judgement of the size and characteristics of the same object between when it is moving and when it is stationary.

The term "change in movement" may refer to a situation where an object stops moving or starts moving, and in such situation, it becomes possible to distinguish and extract the first image containing the stationary object and the second image containing the moving object from among a plurality of images.

Thereafter, the noise filter 120 may apply a noise filter with a predetermined intensity (or first intensity) to the second image to obtain a third image. That is, the noise filter 120 may apply the noise filter only to the second image containing the moving object. As a result, the second image with the noise filter applied thereto may have the effect of noise removal but also may result in a side effect from the noise removal. On the other hand, the first image with no noise filter applied thereto may not have any side effect but may still have potential noise. However, since the first image includes the stationary object, the first image may be used as a reference image because it is less likely to have noise due to object movement.

The noise filter 120 may be a three-dimensional (3D) noise filter. Generally, noise filters are divided into a two-dimensional (2D) noise filter and the 3D noise filter.

The 2D noise filter may be a filter that removes noise using spatial adjacency within a single frame. The 2D noise filter may reference surrounding pixels for correction. The 2D noise filter may be effective in reducing noise in a moving object, but when applied to a stationary object such as a background, the 2D noise filter may lead to blurring and a decrease in resolution.

In contrast, the 3D noise filter may be a filter that removes noise by referencing the area of an object across multiple frames on a time axis. Since the 3D noise filter takes into account the pixels of previous and subsequent image frames, it may be highly effective in reducing noise in a stationary object that is not sensitive to time changes. However, applying the 3D noise filter to an image with a fast or significant movement may result in a side effect such as a residual image, a dragging phenomenon, a ghosting phenomenon, etc.

Thus, the noise filter applied to the second image may be the 3D noise filter, and the first image may not have any noise filter applied thereto. However, example embodiments are not limited to this, and alternatively, the 2D noise filter may also be applied to the first image.

The labeling unit 130 may determine the intensity of a side effect using the difference between the stationary object included in the first image and the moving object included in the third image. For example, the labeling unit 130 may determine the size of an object from the bounding box of the recognized object. When the size of the bounding box changes by a greater amount than a predetermined threshold value (or ratio) due to the movement of the recognized object (that is, when there is a greater difference than the predetermined threshold value between the size of the bounding box of the stationary object and the size of the bounding box of the moving object in the image with the noise filter applied thereto), it may be determined that a side effect has occurred, and the corresponding difference value may be determined as the size of the side effect and then used as input data or label for machine learning. Moreover, the difference value may be a size-indicating numerical value, but may also be expressed as the ratio of the difference between the sizes of the bounding boxes of the stationary object and the moving object to the size of each of the bounding boxes.

Specifically, the difference between the stationary object and the moving object may be determined as the sum of absolute differences (SAD) of pixel differences within the corresponding area between the stationary object and the moving object. For example, when the object is a person, the corresponding area may be considered as the edge part of the person's face.

Figure 3A:
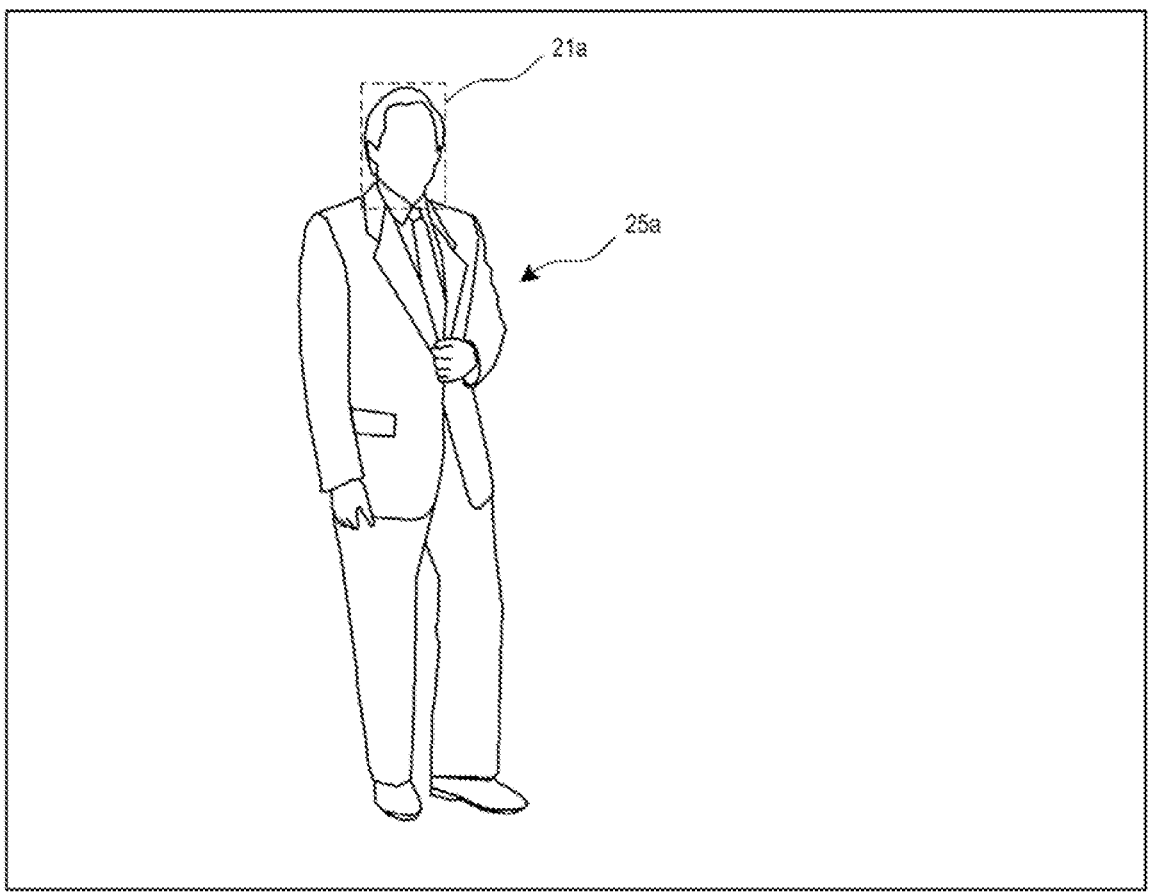
FIG. 3A is a diagram illustrating a facial area of a stationary object included in a first image according to some embodiments of the present disclosure.
Figure 3B:
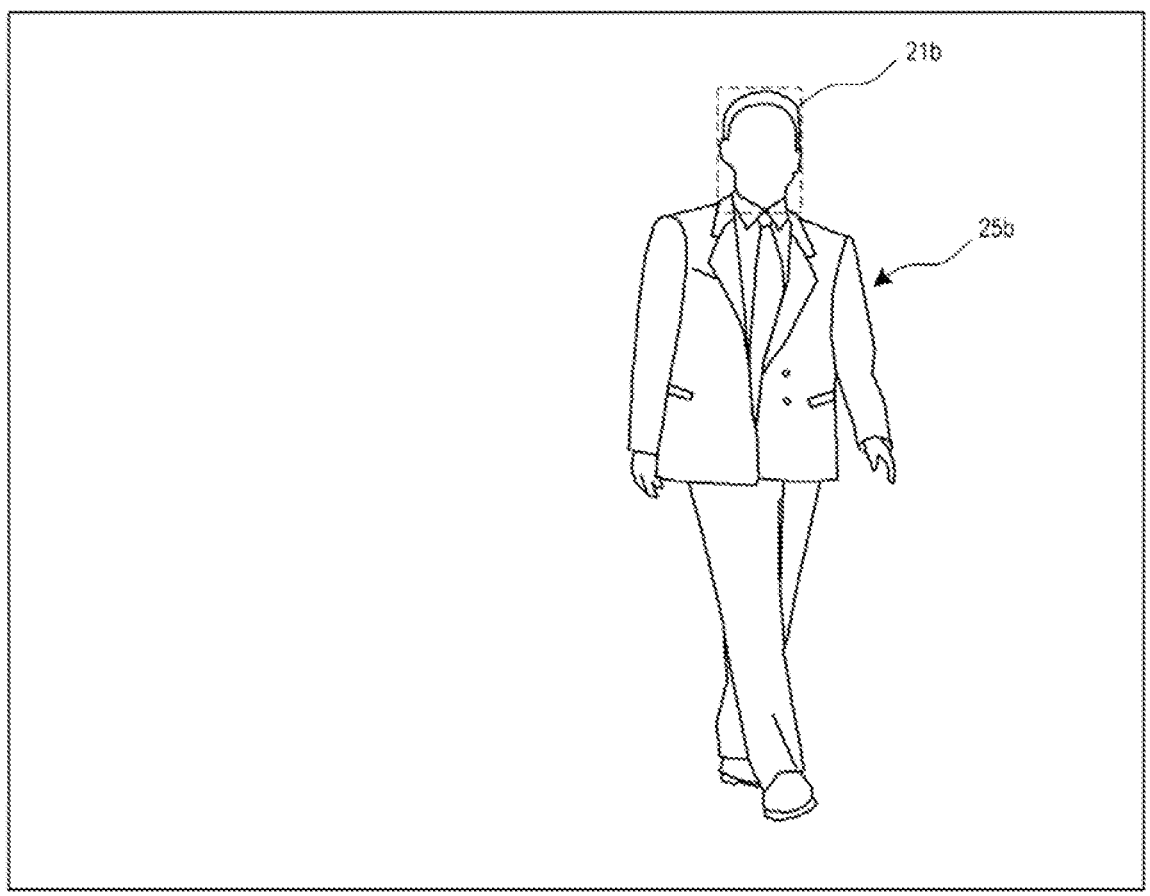
FIG. 3B is a diagram illustrating a facial area of a moving object included in an image according to some embodiments of the present disclosure.

FIG. 3A is a diagram illustrating a facial area of a stationary object included in a first image according to some embodiments of the present disclosure. FIG. 3B is a diagram illustrating a facial area of a moving object included in an image according to some embodiments of the present disclosure. In particular, FIG. 3A is a diagram illustrating a facial area 21a of a stationary object 25a included in a first image 20a, and FIG. 3B is a diagram illustrating a facial area 21b of a moving object 25b included in a second image 20b.

As illustrated, the stationary object 25a may be in a stationary state, while the moving object 25b may be in motion. Here, the two objects 25a and 25b may represent the same person and may include the corresponding facial area 21a or 21b. The labeling unit 130 may determine the sum of pixel differences in the corresponding areas 21a and 21b and classify and display the intensity of a side effect according to the magnitude of the result of the calculation. For example, the intensity of the side effect may be divided into a total of 10 levels with a value from 0 to 9 assigned thereto. Here, level 0 may indicate no side effect, and level 9 may indicate a maximum side effect.

Referring to FIG. 2, the labeling unit 130 may also use other criteria than the sum of the pixel differences to determine the side effect. For example, the size of the side effect may be determined based on the difference between high-frequency components from a plurality of frequency domain blocks included in the corresponding areas. That is, the magnitude of the side effect caused by the application of the noise filter compared to the original may be identified not only based on the difference between blocks in image domains, but also based on how the size of a particular high-frequency component representing an edge or noise part in each image, from frequency domain blocks (e.g., discrete cosine transform (DCT) blocks obtained by performing DCT transformation on image blocks), differs between the corresponding areas of the first and second images.

Figure 4A:
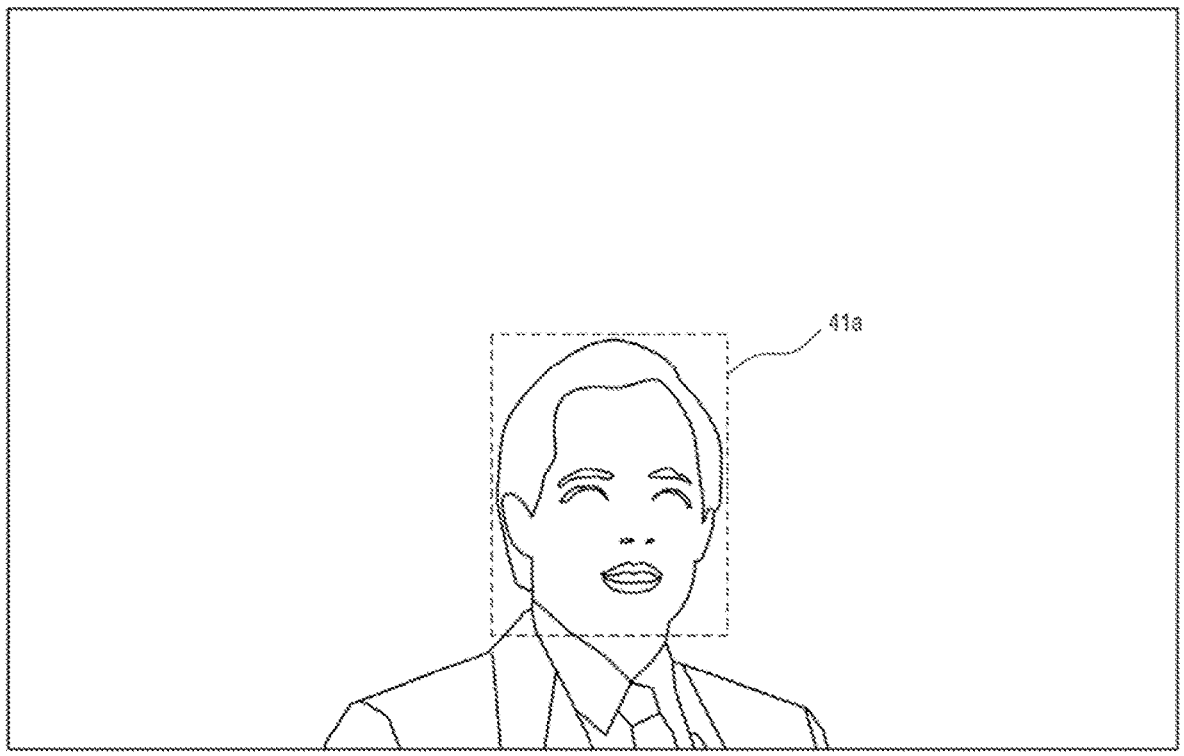
FIG. 4A is a diagram illustrating a facial area of a stationary object included in an image according to some embodiments of the present disclosure.
Figure 4B:
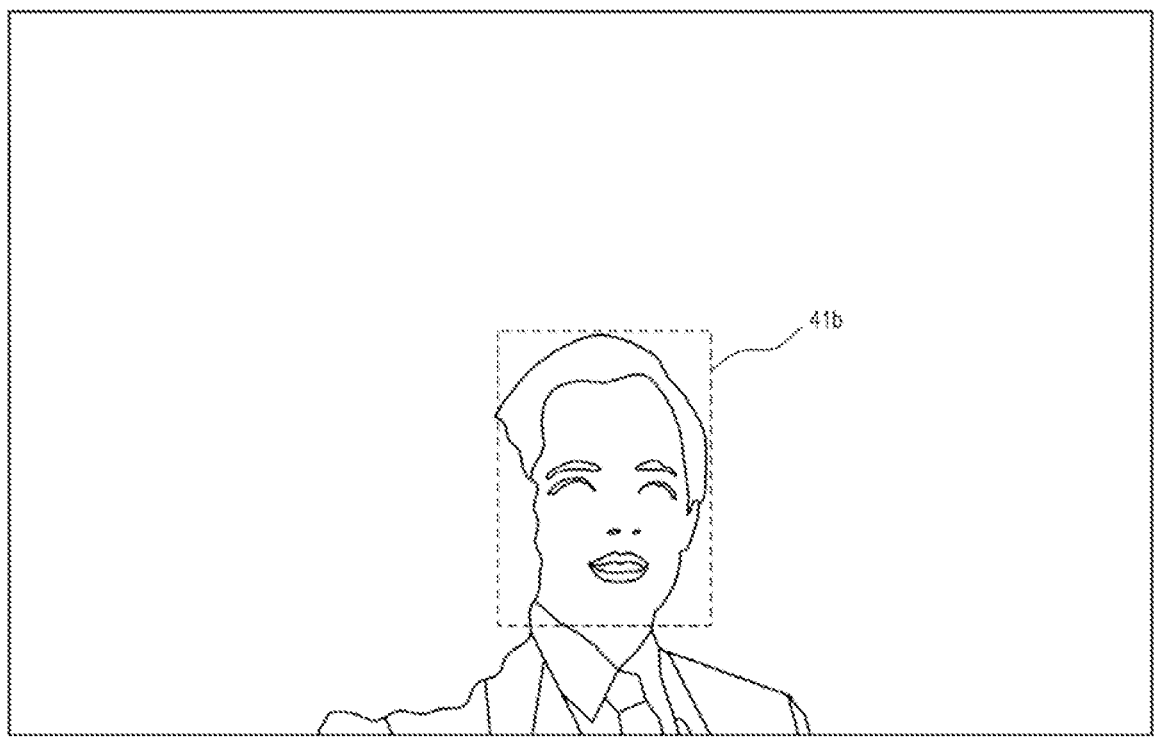
FIG. 4B is a diagram illustrating a facial area of a moving object included in an image according to some embodiments of the present disclosure.
Figure 4C:
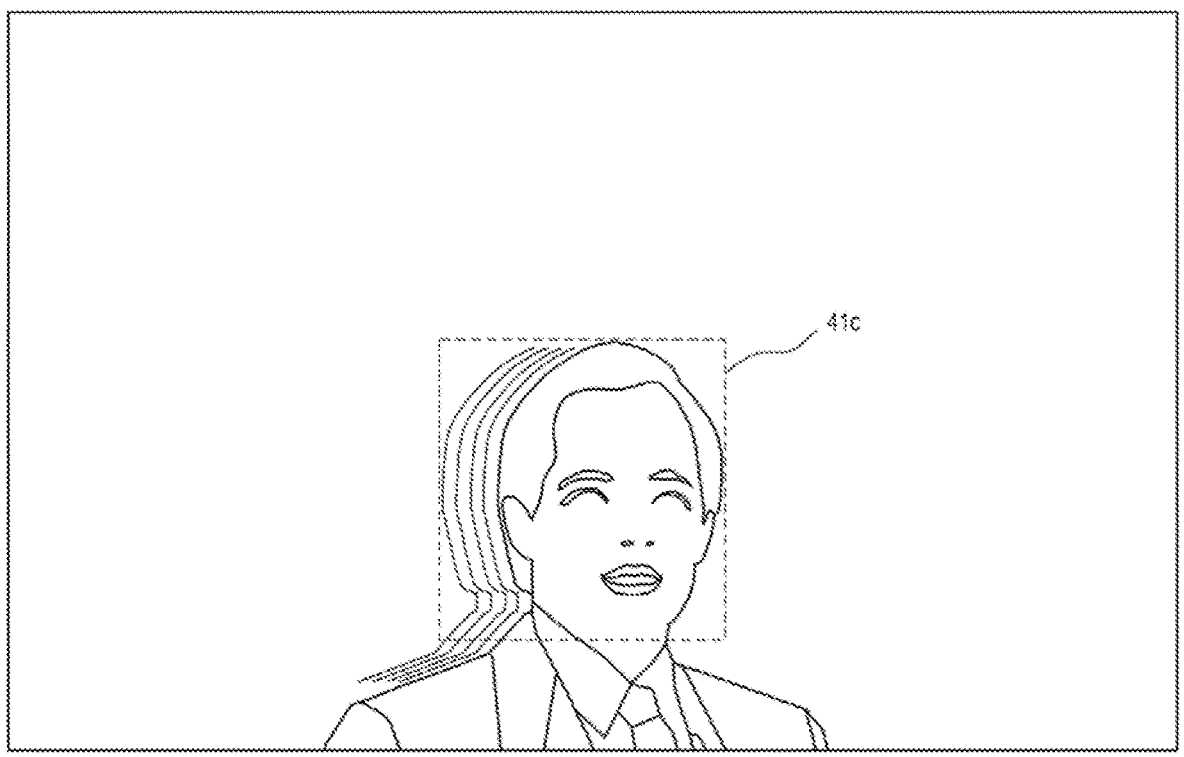
FIG. 4C is a diagram illustrating a facial area of a moving object included in an image according to some embodiments of the present disclosure.

FIG. 4A is a diagram illustrating a facial area of a stationary object included in an image according to some embodiments of the present disclosure. FIG. 4B is a diagram illustrating a facial area of a moving object included in an image according to some embodiments of the present disclosure. FIG. 4C is a diagram illustrating a facial area of a moving object included in an image according to some embodiments of the present disclosure. Specifically, FIG. 4A is a diagram illustrating a facial area 41a of a stationary object included in a first image 40a, FIG. 4B is a diagram illustrating a facial area 41b of a moving object included in a third image 40b, and FIG. 4C is a diagram illustrating a facial area 41c of a moving object included in a third image 40c.

Since no noise filter, or only the 2D noise filter, is applied to the first image 40a and there is no object motion in the first image 40a, the facial area 41a of the stationary object may be properly displayed without distortion, as illustrated in FIG. 4A.

In contrast, FIGS. 4b and 4C illustrate cases where the 3D noise filter is applied to a second image including a moving object. As a result, a side effect may occur in which part of the facial area 41b of the moving object disappears due to ghosting, as illustrated in FIG. 4B, or a dragging or residual image phenomenon may occur in the facial area 41c of the moving object, as illustrated in FIG. 4C. When a side effect occurs due to the application of the 3D noise filter, there may arise a significant difference between the facial area 41a of FIG. 4A and the facial area 41b or 41c of FIG. 4B or 4C. Thus, by determining the SAD or the difference between high-frequency components, the size of the side effect may be quantitatively measured.

Referring again to FIG. 2, the machine learning unit 140 may input the determined size of the side effect and the image attributes of the input images as a label and may perform machine learning on the second image, thereby obtaining AI parameters (or network parameters). This machine learning process may include multiple iterations of learning with numerous labeled training data until the AI produces a desired answer.

Typically, such a machine learning technique belongs to the field of supervised learning. Supervised learning involves learning from examples, where learning data is clearly assigned with a label (or correct answer). That is, input data is already paired with a desired output result. Supervised learning generally requires a large amount of annotated data, and the performance of a trained algorithm is directly dependent on the quality of the learning data. Therefore, the algorithm needs to be trained with a variety of images, using image attributes that represent the environment in which the images are taken, such as various object instances, orientations, scales, lighting conditions, backgrounds, etc. Only if the learning data represents planned use cases, a final analysis application may make accurate predictions even when processing new data not seen in a training phase.

In some embodiments, a target value, which belongs to a label, pertains to the size of the side effect, but for a more accurate machine learning, repeated learning through images classified under various image attributes is necessary. According to some embodiments, the image attributes may include at least one of the type of each object, the moving speed of each object, the moving direction of each object, and the brightness of each image. Therefore, machine learning according to some embodiments may acquire a more accurate learning model (i.e., AI parameters) by inputting the size of the side effect as a label for a considerable number of input images with various image attributes and repeating machine learning.

That is, the machine learning unit 140 may perform neural network learning on multiple input images in accordance with combinations of image attributes. For example, the machine learning unit 140 may repeat the neural network learning using various input images under different conditions, such as images of a person moving left and right at a speed of 5 km/h during the day and images of a car moving back and forth at a speed of 40 km/h at night.

Particularly, the machine learning unit 140 may repeat the neural network learning, while adjusting the AI parameters until the difference between the intensity of a side effect obtained from the neural network learning and the determined size of the side effect falls within an acceptable range (e.g., a predefined range) and the determined size of the corresponding side effect converges within a permissible error range (e.g., a predefined error range). Through such repeated learning, the machine learning unit 140 may obtain AI parameters (also referred to as network parameters) optimized for implementation with the embodiments disclosed herein.

Figure 6:
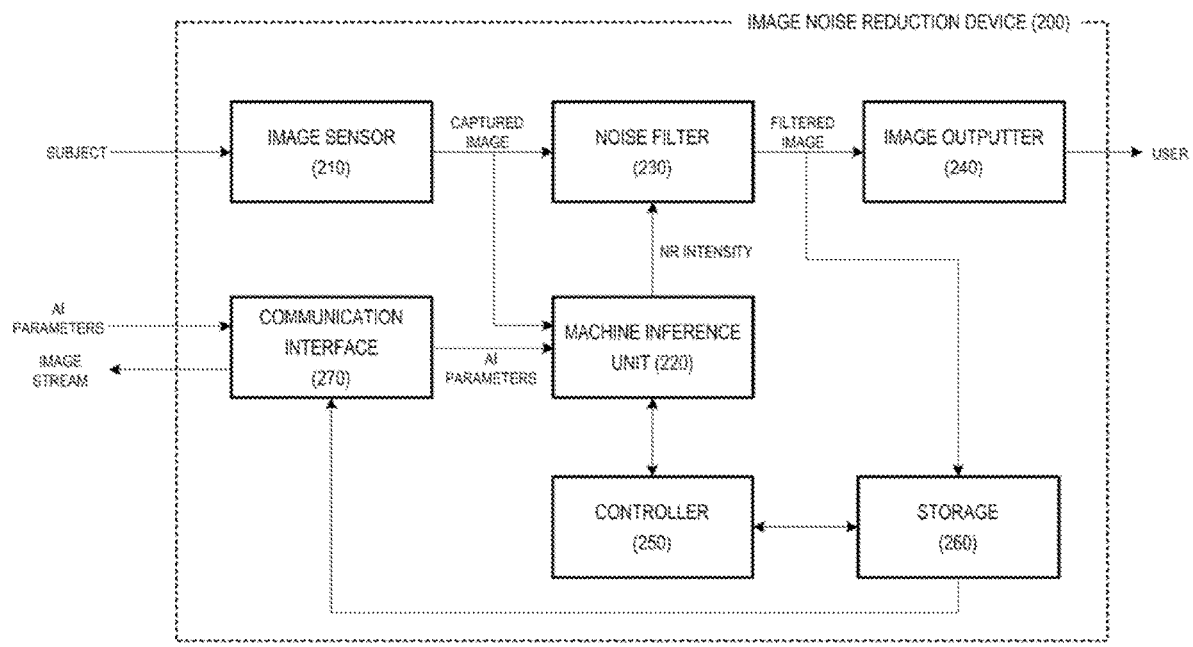
FIG. 6 is a block diagram illustrating a configuration of an image noise reduction device according to some embodiments of the present disclosure.

The obtained AI parameters may be used to perform machine inference on actual images, determining the actual size of the side effect and using a noise filter with an intensity corresponding to the actual size of the side effect to filter the actual images. For this purpose, the communication interface 170 may provide the AI parameters to an image noise reduction device 200 (FIG. 6). The communication interface 170 may include an interface for sending and receiving transmission packets to communicate with an external device and may be implemented as a wired network interface for connecting with wired lines or a wireless network interface for connecting with wireless lines.

Figure 5A:
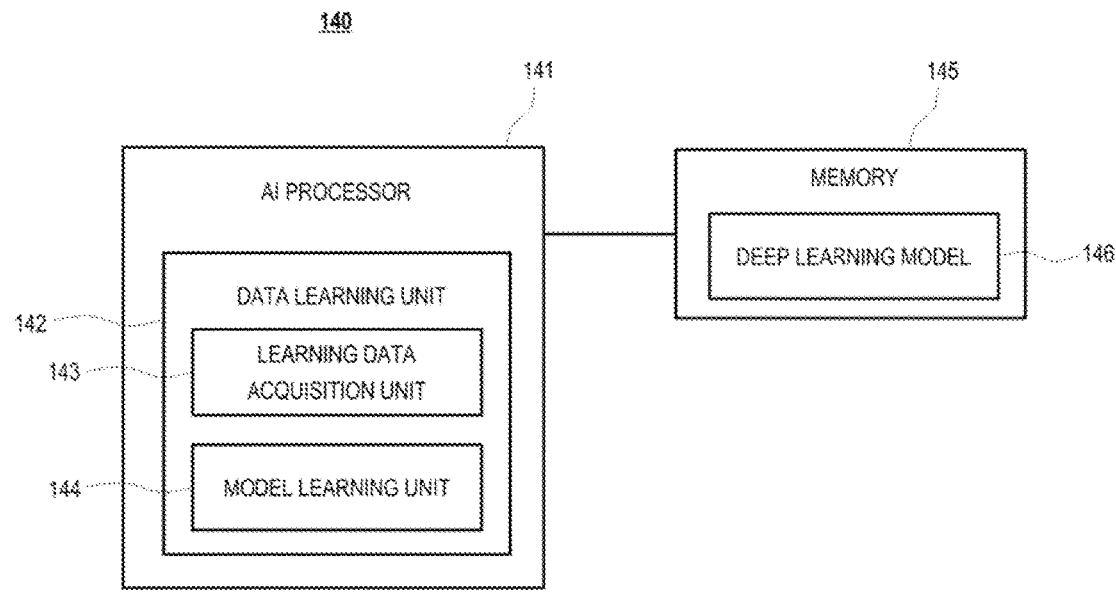
FIG. 5A is a block diagram illustrating a machine learning unit, according to some embodiments of the present disclosure.
Figure 5B:
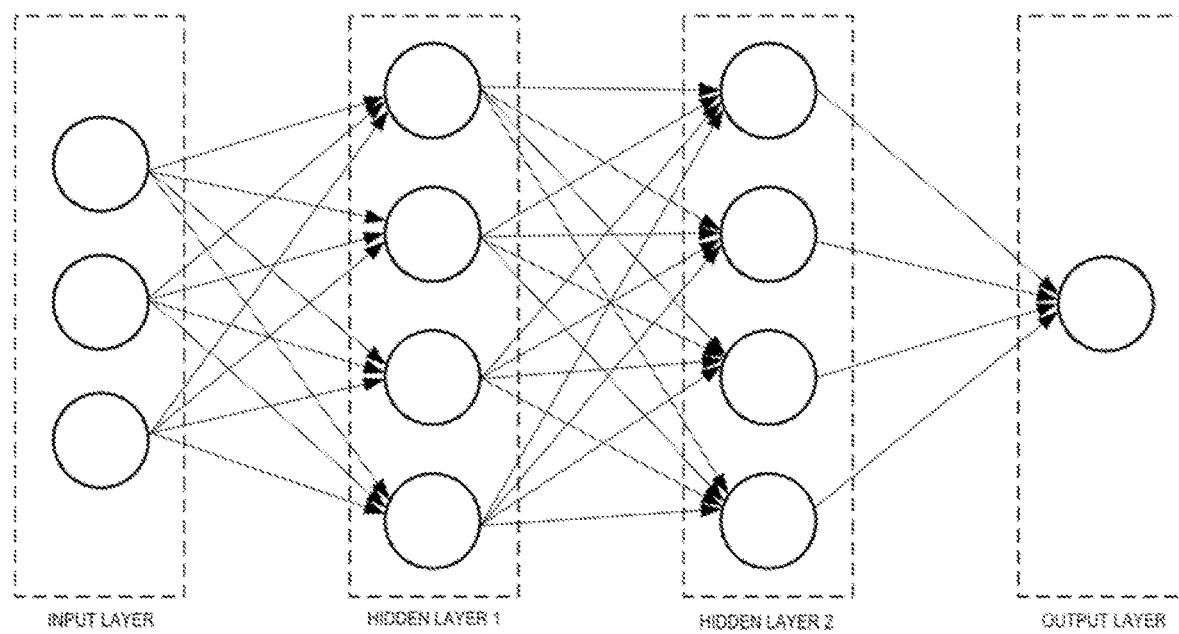
FIG. 5B is a diagram illustrating an example of a deep neural network (DNN) model used by a machine learning unit according to some embodiments of the present disclosure.

FIG. 5A is a block diagram illustrating a machine learning unit 140, according to some embodiments of the present disclosure. FIG. 5B is a diagram illustrating an example of a deep neural network (DNN) model used by a machine learning unit 140 according to some embodiments of the present disclosure.

A machine learning unit 140 may include a communication interface including an AI module capable of performing AI processing, a server including the AI module, or the like. In addition, the machine learning unit 140 may include an AI processor 141 and a memory 145. The machine learning unit 140 may be a computing device capable of learning a neural network and may be implemented as various electronic devices such as a server, a desktop PC, a notebook PC, and a tablet PC.

The AI processor 141 may learn a neural network by using a program stored in the memory 145. In particular, the AI processor 141 may learn a neural network for recognizing the side effect. Here, the neural network for recognizing the side effect data may be designed to simulate a human brain structure on a computer, and may include a plurality of network nodes with weights that simulate neurons of the human neural network.

The plurality of network modes may exchange data according to their respective connection relationships such that neurons may simulate the synaptic activity of neurons for sending and receiving signals through synapses. Here, the neural network may include a deep learning model developed from a neural network model. In the deep learning model, a plurality of network nodes may be located in different layers and exchange data according to a convolutional connection relationship. Examples of neural network models include various deep learning techniques, such as DNNs, convolutional deep neural networks (CNNs), recurrent neural networks (RNNs), restricted Boltzmann machine (RBMs), deep belief networks (DBNs), or Deep Q-Networks, and may be applied to fields such as computer vision, speech recognition, natural language processing, and speech/signal processing.

The processor that performs the functions as described above may be a general-purpose processor (e.g., CPU), but may be an AI dedicated processor (e.g., GPU) for artificial intelligence learning. The memory 145 may store various programs and data required for the operation of the machine learning unit 140. The memory 145 may be implemented by a non-volatile memory, a volatile memory, a flash memory, a hard disk drive (HDD), a solid state drive (SDD), or the like. The memory 145 is accessed by the AI processor 141, and data read/write/edit/delete/update by the AI processor 141 may be performed. In addition, the memory 145 may store a neural network model (e.g., a deep learning model 146) generated through a learning algorithm for data classification/recognition in accordance with an exemplary embodiment of the present disclosure.

The AI processor 141 may include a data learning unit 142 for learning a neural network for data classification/recognition. The data learning unit 142 may learn a criterion on which training data to use and how to classify and recognize data using the training data in order to determine data classification/recognition. The data learning unit 142 may learn the deep learning model by acquiring training data to be used for learning and applying the acquired training data to the deep learning model.

The data learning unit 142 may be manufactured in the form of at least one hardware chip and mounted on the machine learning unit 140. For example, the data learning unit 142 may be manufactured in the form of a dedicated hardware chip for artificial intelligence (AI), or may be manufactured as a part of a general-purpose processor (CPU) or a dedicated graphics processor (GPU) and mounted on the machine learning unit 140. In addition, the data learning unit 142 may be implemented as a software module. When implemented as a software module (or a program module including an instruction), the software module may be stored in a non-transitory computer-readable medium. In this case, at least one software module may be provided by an operating system (OS) or an application.

The data learning unit 142 may include a training data acquisition unit 143 and a model learning unit 144.

The training data acquisition unit 143 may acquire training data requested for the neural network model for classifying and recognizing data. For example, the training data acquisition unit 143 may acquire raw data and/or learning data for input into the neural network model as training data.

The model learning unit 144 may learn to have a criterion for determining how the neural network model classifies predetermined data by using the acquired training data. In this case, the model learning unit 144 may train the neural network model through supervised learning using at least a portion of the training data as a criterion for determination. Alternatively, the model learning unit 144 may train the neural network model through unsupervised learning to discover a criterion by self-learning using the training data without being supervised. In addition, the model learning unit 144 may train the neural network model through reinforcement learning by using feedback on whether the result of situation determination based on the learning is correct. In addition, the model learning unit 144 may train the neural network model by using a learning algorithm including an error back-propagation method or a gradient decent method.

When the neural network model is trained, the model learning unit 144 may store the learned neural network model in the memory. The model learning unit 144 may store the learned neural network model in a memory of a server connected to the machine learning unit 140 via a wired or wireless network.

The data learning unit 142 may further include a training data preprocessor and a training data selection unit in order to improve the analysis result of the recognition model or to save resources or time required for generating the recognition model.

The training data preprocessor may preprocess the acquired data such that the acquired data may be used for learning to determine the situation. For example, the training data preprocessor may process the acquired data into a preset format such that the model learning unit 144 may use the training data acquired for learning for image recognition.

In addition, the training data selection unit may select data required for training from the training data acquired by the training data acquisition unit 143 or the training data preprocessed by the preprocessor. The selected training data may be provided to the model learning unit 144. For example, the training data selection unit may select only data on an object included in a specific region as the training data by detecting the specific region among images acquired through a camera.

In addition, the data learning unit 142 may further include a model evaluation unit to improve the analysis result of the neural network model.

The model evaluation unit may input evaluation data to the neural network model, and may cause the model learning unit 144 to retrain the neural network model when an analysis result output from the evaluation data does not satisfy a predetermined criterion. In this case, the evaluation data may be predefined data for evaluating the recognition model. For example, the model evaluation unit may evaluate the model as not satisfying a predetermined criterion when, among the analysis results of the trained recognition model for the evaluation data, the number or ratio of evaluation data for which the analysis result is inaccurate exceeds a preset threshold.

Referring to FIG. 5B, the DNN may be an artificial neural network (ANN) including several hidden layers (e.g., hidden layer 1 and hidden layer 2) between an input layer and an output layer. The DNN may model complex non-linear relationships, as in typical artificial neural networks.

For example, in a DNN structure for an object identification model, each object may be represented as a hierarchical configuration of basic image elements. In this case, the additional layers may aggregate the characteristics of the gradually gathered lower layers. This feature of DNNs allows more complex data to be modeled with fewer units (nodes) than similarly performed artificial neural networks.

As the number of hidden layers increases, the artificial neural network is called 'deep', and machine learning paradigm that uses such a sufficiently deepened artificial neural network as a learning model is called deep learning. Furthermore, the sufficiently deep artificial neural network used for the deep learning is commonly referred to as the DNN.

In some embodiments, data required to train a side effect model obtained by the labeling unit 130 may be input to the input layer of the DNN, and meaningful evaluation data that may be used by a user may be generated through the output layer while the data pass through the hidden layers. In this way, the accuracy of the evaluation data trained through the neural network model may be represented by a probability, and the higher the probability, the higher the accuracy of the evaluated result.

FIG. 6 is a block diagram illustrating a configuration of an image noise reduction device according to some embodiments of the present disclosure. The configuration of the image noise reduction device 200, which interacts with the image noise learning server 100 of FIG. 2, is as illustrated in FIG. 6. The image noise reduction device 200 may be a device that reduces image noise by inferring the size of the side effect based on the AI parameters provided from the image noise learning server 100 and the captured images, and then filters the captured images with the intensity of a noise filter corresponding to the side effect. The image noise reduction device 200 may be implemented within the network cameras 50 of FIG. 1 and may be used to perform real-time noise filtering on the captured images. The learning process from the image noise learning server 100 may be integrated into the image noise reduction device 200 but may impact the resource availability of the network cameras and the cause inefficiency of performing individual learning in each device.

Referring to FIG. 6, the image noise reduction device 200 may include an image sensor 210, a machine inference unit 220, a noise filter 230, an image outputter 240, a controller 250, a storage 260, and a communication interface 270.

The controller 150 may control the operations of the other components of the image noise learning server 100 and may be implemented as a CPU or microprocessor. Additionally, the storage 260 may serve as a storage medium that stores result data from the operation performed by the controller 250 or data needed for the operation of the controller 150, and may be implemented as a volatile memory or a non-volatile memory. The communication interface 270 may receive AI parameters (or a learning model) from the image noise learning server 100. The communication interface 270 may include an interface for sending and receiving transmission packets to communicate with an external device and may be implemented as a wired network interface for connecting with wired lines or a wireless network interface for connecting with wireless lines. The communication interface 270 may include any one or any combination of a socket, a plug, a cable, a universal serial bus (USB), a keyboard, a scanner, a digital modem, a radio frequency (RF) modem, an antenna circuit, a WiFi chip, and their equivalents along with related software and/or firmware.

The image sensor 210 may capture an image of a subject. The image sensor 210, which may be a device that converts incident light into digital values that form image data, may typically be implemented as a charge-coupled device (CCD) or complementary metal-oxide semiconductor (CMOS).

The machine inference unit 220 may infer the intensity of a side effect based on the AI parameters (or learning model) and the captured image. Specifically, the machine inference unit 220 may apply the AI parameters obtained from the machine learning unit 140 to an actual image to infer the size of the side effect in the actual image, and the size of the side effect inferred by the machine inference unit 220 may be represented as a probability for each size. This machine inference process may follow a similar procedure to a machine learning process. That is, if the machine learning process is the process of determining the AI parameters through repetitive learning on numerous raw data images to find labeled correct answers, the machine inference unit 220 may perform a similar procedure using the AI parameters (i.e., an already-established learning model) to infer the size of the side effect for a particular actual image.

Consequently, the machine inference unit 220 may provide the inferred size of the side effect for the actual image to the noise filter 230. Simultaneously, the machine inference unit 220 may also provide the inferred size of the side effect back to the machine learning unit 140 through the communication interface 270, enabling the update of the AI parameters.

The noise filter 230 may change the intensity of the noise filter to a second intensity and apply the second intensity to the actual image if the inferred size of the side effect exceeds a threshold value. For example, if the inferred size of the side effect is greater than the threshold value, the noise filter 230 may lower the intensity of the noise filter to the second intensity, which is lower than a first intensity. Alternatively, if the inferred size of the side effect is greater than the threshold value, the noise filter 230 may reduce the intensity of the 3D noise filter to the second intensity, which is lower than the first intensity, and may raise the intensity of the 2D noise filter in accordance with the lowered filter intensity.

The noise filter 230 may perform noise filtering on the actual image using the adjusted intensity of the noise filter (e.g., the 3D noise filter) and may provide the resulting image to the image outputter 240 and the storage 260. The image outputter 240, which may be a display device such as a plasma display panel (PDP), a liquid crystal display (LCD), a light-emitting diode (LED), or an organic LED (OLED), may display the resulting image to a user.

Additionally, the resulting image stored in the storage 260 may be provided again to the communication interface 270, and the communication interface 270 may packetize the resulting image as an image stream and transmit the image stream to other devices on the network 40.

Figure 7:
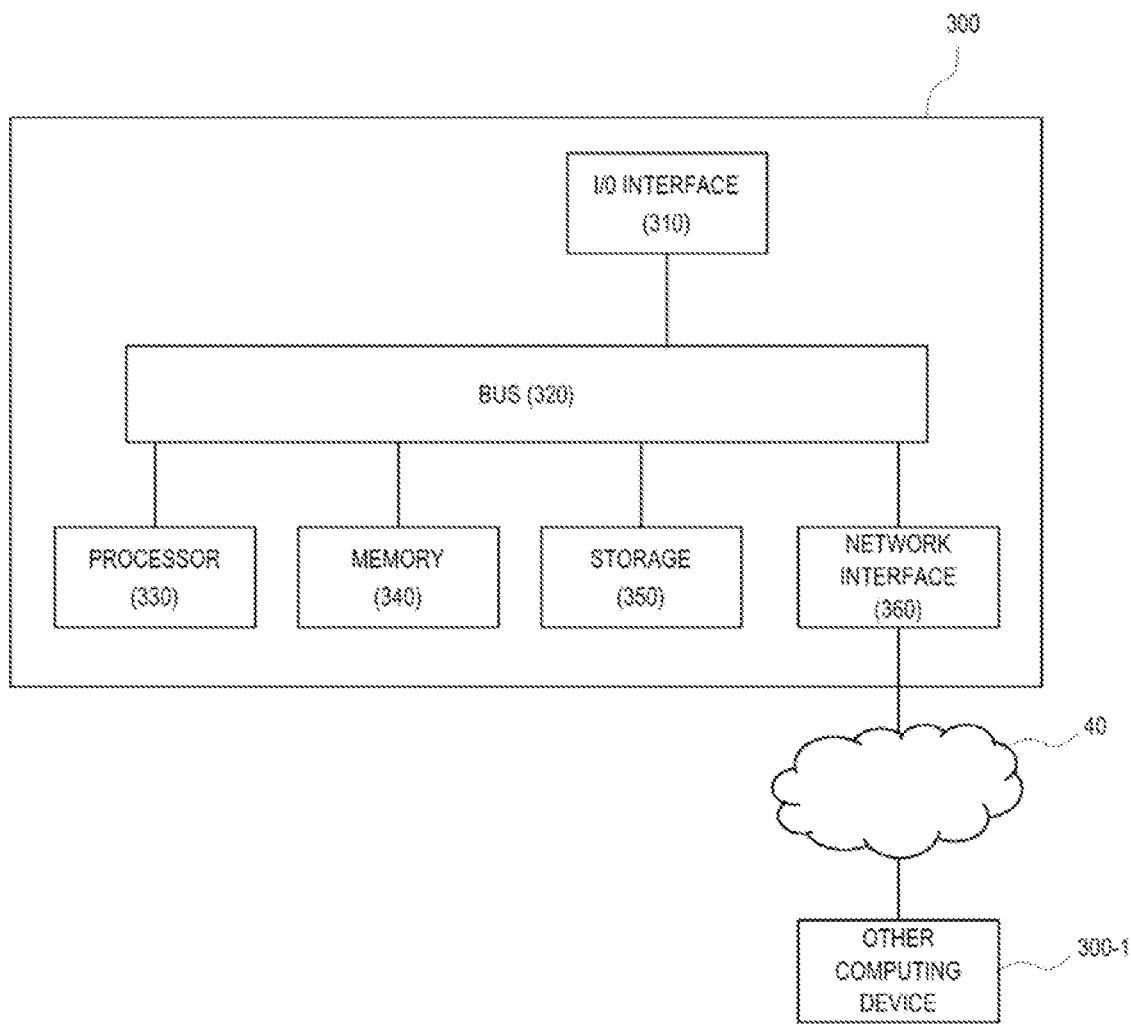
FIG. 7 is a block diagram illustrating a hardware configuration of a computing device that implements an image noise learning server and an image noise reduction device, according to some embodiments of the present disclosure.

FIG. 7 is a block diagram illustrating a hardware configuration of a computing device 300 that implements an image noise learning server 100 and an image noise reduction device 200, according to some embodiments of the present disclosure.

Referring to FIG. 7, a computing device 300 may include a bus 320, a processor 330, a memory 340, a storage 350, an input/output (I/O) interface 310, and a network interface 360. The bus 320 may be a path for the transmission of data between the processor 330, the memory 340, the storage 350, the I/O interface 310, and the network interface 360. However, it is not particularly limited how the processor 330, the memory 340, the storage 350, the I/O interface 310, and the network interface 360 are connected. The processor 330 may be an arithmetic processing unit such as a CPU or a GPU. The memory 340 may be a memory such as a random-access memory (RAM) or a read-only memory (ROM). The storage 350 may be a storage device such as a hard disk, a solid state drive (SSD), or a memory card. The storage 350 may also be a memory such as a RAM or a ROM.

The I/O interface 310 may be an interface for connecting the computing device 300 and an I/O device. For example, a keyboard or a mouse may be connected to the I/O interface 310.

The network interface 360 may be an interface for communicatively connecting the computing device 300 and an external device to exchange transport packets with each other. The network interface 360 may be a network interface for connection to a wired line or for connection to a wireless line. For example, the computing device 300 may be connected to another computing device 300-1 via a network 40.

The storage 350 may store program modules that implement the functions of the computing device 300. The processor 330 may implement the functions of the computing device 300 by executing the program modules. The processor 330 may read the program modules into the memory 340 and may then execute the program modules.

The hardware configuration of the computing device 300 is not particularly limited to the configuration illustrated in FIG. 7. For example, the program modules may be stored in the memory 340. In this example, the computing device 300 may not include the storage 350.

The image noise reduction device 200 may at least include the processor 330 and the memory 340, which may store instructions that may be executed by the processor 330. The image noise reduction device 200 of FIG. 6, in particular, may be driven by executing instructions including a variety of functional blocks or steps included in the image noise reduction device 200, via the processor 330.

Figure 8:
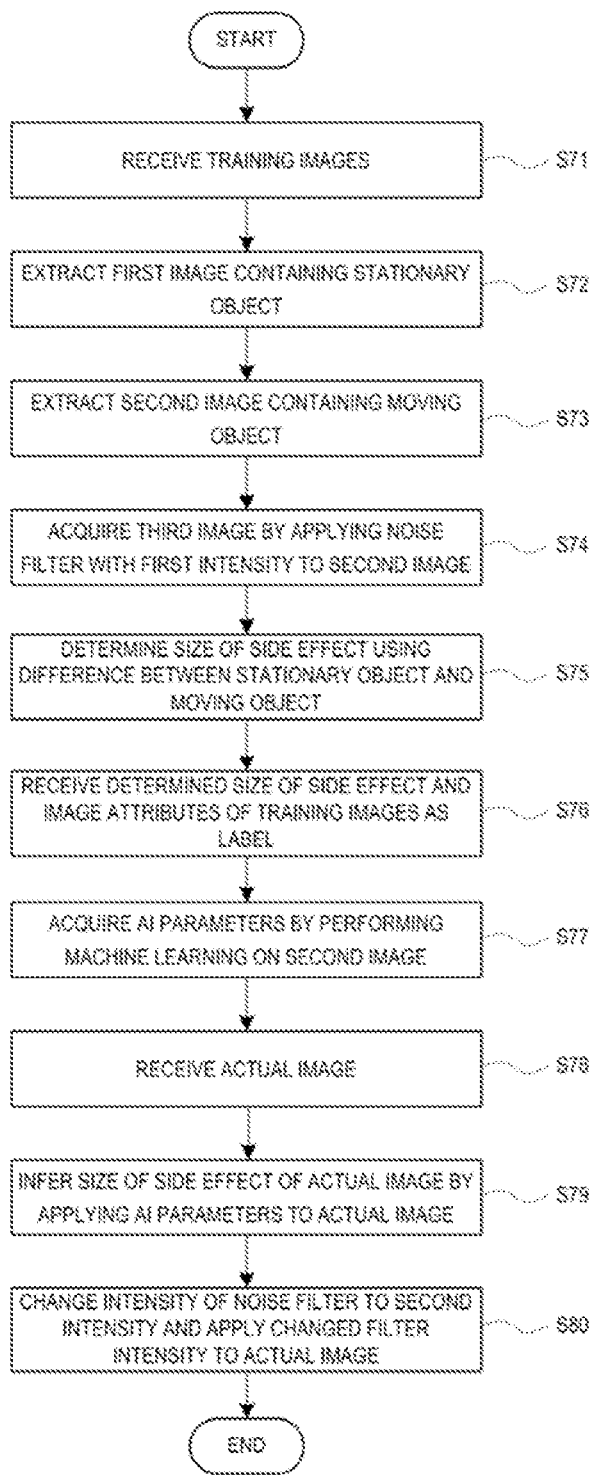
FIG. 8 is a flowchart illustrating an image noise reduction method according to some embodiments of the present disclosure.

FIG. 8 is a flowchart illustrating an image noise reduction method according to some embodiments of the present disclosure. In particular, FIG. 8 is a flowchart illustrating an image noise reduction method that may be performed by the image noise learning server 100 and the image noise reduction device 200.

In operation S71, the image input interface 105 may receive input images captured by the cameras. In operation S72, the image extractor 110 may extract a first image containing a stationary object from among the input images and in operation S73, the image extractor 110 may extract a second image containing a moving object from among the input images.

In operation S74, the noise filter 120 may acquire a third image by applying a noise filter with the first intensity to the second image. In operation S75, the labeling unit 130 may determine the intensity of a side effect using the difference between the stationary object in the first image and the moving object in the third image.

In operation S76, the determined size of the side effect is provided to the machine learning unit 140, and the machine learning unit 140 may receive the determined size of the side effect and the image attributes of the input images as a label and may acquire AI parameters by performing machine learning on the second image based on the received label.

In operation S78, the image noise reduction device 200 may receive the AI parameters and input an actual image captured by the image sensor 210. In operation S79, the machine inference unit 220 may infer the size of the side effect in the actual image by applying the AI parameters obtained by the machine learning unit 140 to the actual image.

In operation S80, if the inferred size of the side effect exceeds a threshold value, the noise filter 230 may change the intensity of the noise filter to a second intensity and may apply the second intensity to the actual image, providing an optimally noise-filtered image to the image outputter 240.

Here, the difference between the stationary object and the moving object may be defined as pixel differences between the corresponding areas of the stationary object and the moving object, and the size of the side effect may be determined based on the sum of the pixel differences between the corresponding areas, classified into one of multiple levels.

Additionally, the image attributes may include at least one of the type of each object, the moving speed of each object, the moving direction of each object, and the brightness of each image.

If the inferred size of the side effect is greater than the threshold value, the noise filter 120 may lower the intensity of the noise filter to the second intensity, lower than a first intensity. Alternatively, if the inferred size of the side effect is greater than the threshold value, the noise filter 120 may reduce the intensity of the 3D noise filter to the second intensity, lower than the first intensity, and raise the intensity of the 2D noise filter in accordance with the lowered filter intensity.

According to some embodiments, various types of noise occurring within an image may be adaptively reduced in accordance with the characteristics of the image in different environments.

Furthermore, according to some embodiments, the occurrence of a side effect such as a ghosting or dragging phenomenon may be suppressed to an appropriate degree while removing various types of noise occurring within the image.

Additionally, according to some embodiments, simultaneous and complementary adjustment the intensities of both 2D and 3D noise reduction filters for a particular image may be performed.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

At least one of the devices, units, components, modules, units, or the like represented by a block or an equivalent indication in the above embodiments including, but not limited to, FIGS. 2, 5A, 6 and 7, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Each of the embodiments provided in the above description is not excluded from being associated with one or more features of another example or another embodiment also provided herein or not provided herein but consistent with the disclosure.

While the disclosure has been particularly shown and described with reference to embodiments thereof, it will be understood that various changes in form and details may be made therein without departing from the spirit and scope of the following claims.

What is claimed is:

1. An image noise learning server comprising:
an image input interface configured to receive training images;
at least one processor configured to control:
an image extractor to extract, from the training images, a first image that includes a stationary object and a second image that includes a moving object;
a noise filter to obtain a third image by applying noise filtering with a first intensity to the second image, the third image including the moving object;
a labeling unit to determine an intensity of a side effect based on a difference between the stationary object included in the first image and the moving object included in the third image; and
a machine learning unit to receive, as a label, the determined intensity of the side effect and image attributes of the training images, and obtain artificial intelligence (AI) parameters by performing machine learning on the second image based on the received label; and
a communication interface configured to transmit the obtained AI parameters.

2. The image noise learning server of claim 1, wherein the training images consist of images in which the stationary object starts moving and images in which the moving object stops moving.

3. The image noise learning server of claim 1, wherein the difference between the stationary object and the moving object corresponds to pixel differences between corresponding areas of the stationary object and the moving object.

4. The image noise learning server of claim 3, wherein the intensity of the side effect is determined as a sum of the pixel differences.

5. The image noise learning server of claim 3, wherein the intensity of the side effect is determined based on differences between high-frequency components from a plurality of frequency domain blocks included in the corresponding areas.

6. The image noise learning server of claim 3, wherein the stationary object and the moving object comprise at least one person, and
   wherein the corresponding areas are edge portions of faces of the at least one person.

7. The image noise learning server of claim 1, wherein the noise filter is a three-dimensional (3D) noise filter, and
   wherein the side effect comprises at least one of a residual image phenomenon, a dragging phenomenon, and a ghosting phenomenon.

8. The image noise learning server of claim 1, wherein the image attributes comprise at least one of a type of each of the stationary object and the moving object, a moving speed of at least the moving object, a moving direction of at least the moving object, and a brightness of each of the training images.

9. The image noise learning server of claim 8, wherein the at least one processor is configured to control the machine learning unit to perform neural network learning on a plurality of training images in accordance with combinations of the image attributes.

10. The image noise learning server of claim 9, wherein the at least one processor is configured to control the machine learning unit to repeat the neural network learning while changing the AI parameters until a difference between an intensity of a side effect obtained from the neural network learning and the determined intensity is within a predefined range.

11. The image noise learning server of claim 1, wherein the at least one processor is configured to control a machine inference unit to infer an intensity of a side effect, and
   wherein the intensity of the side effect inferred by the machine inference unit is represented as a probability for the intensity of the side effect.

\* \* \* \* \*